(12) United States Patent
Kicinski et al.

(10) Patent No.: US 10,857,973 B2
(45) Date of Patent: Dec. 8, 2020

(54) METHOD AND APPARATUS FOR DISABLING A VEHICLE

(71) Applicants: Walter Erik Kicinski, Murphy, TX (US); Chek S Poh, Garland, TX (US); W. Brad Robinson, Dallas, TX (US); Artis Williams, DeSoto, TX (US)

(72) Inventors: Walter Erik Kicinski, Murphy, TX (US); Chek S Poh, Garland, TX (US); W. Brad Robinson, Dallas, TX (US); Artis Williams, DeSoto, TX (US)

(73) Assignee: A&B Creations, LLC, Garland, TX (US)

( * ) Notice: Subject to any disclaimer, the term of this patent is extended or adjusted under 35 U.S.C. 154(b) by 0 days.

(21) Appl. No.: 14/934,930

(22) Filed: Nov. 6, 2015

(65) Prior Publication Data

US 2020/0114871 A1    Apr. 16, 2020

(51) Int. Cl.
*B60R 25/042* (2013.01)
*B60R 25/102* (2013.01)
*B60R 25/30* (2013.01)

(52) U.S. Cl.
CPC .......... *B60R 25/042* (2013.01); *B60R 25/302* (2013.01); *B60R 25/102* (2013.01)

(58) Field of Classification Search
CPC .......... B60R 25/042; B60R 2025/0405; B60R 25/302; B60R 25/102
See application file for complete search history.

(56) References Cited

U.S. PATENT DOCUMENTS

| 3,112,004 | A | * | 11/1963 | Neaville | G08C 23/04 180/167 |
| 3,580,353 | A | * | 5/1971 | Thompson | F02B 1/00 180/167 |
| 4,660,528 | A | * | 4/1987 | Buck | B60K 31/0058 123/198 DB |
| 4,887,064 | A | * | 12/1989 | Drori | B60R 25/1004 340/5.23 |
| 5,276,728 | A | * | 1/1994 | Pagliaroli | B60R 25/04 180/287 |
| 5,533,589 | A | * | 7/1996 | Critzer | B60R 25/04 180/287 |
| 5,861,799 | A | * | 1/1999 | Szwed | B60R 25/04 123/179.2 |

(Continued)

*Primary Examiner* — Timothy Wilhelm
(74) *Attorney, Agent, or Firm* — W. Thomas Timmons

(57) ABSTRACT

A vehicle disable black box in an owner's automobile and will allow a police vehicle to disable the automobile in the event it is stolen and involved in a high speed chase. A police transceiver is located inside a police vehicle. A vehicle disable software program, installed in the police computer, will give the police officer access to the description of nearby automobiles which are equipped with a Vehicle disable black box. Via the software program, the police officer will view a number of automobiles on the computer screen. Using several key features in the software i.e. make, model, license plate, etc., the police officer will determine which automobile is the correct one to disable, and broadcast wirelessly a signal targeting only the desired vehicle. This "disable" signal will be received by the targeted vehicle disable black box, and shut off power to the fuel line of the automobile.

9 Claims, 6 Drawing Sheets

(56) References Cited

U.S. PATENT DOCUMENTS

| | | | | |
|---|---|---|---|---|
| 6,072,248 A * | 6/2000 | Muise | B60R 25/04 | |
| | | | 180/287 | |
| 6,124,805 A * | 9/2000 | Gabbard | B60R 25/04 | |
| | | | 340/426.12 | |
| 6,232,884 B1 * | 5/2001 | Gabbard | G08C 23/04 | |
| | | | 340/12.27 | |
| 6,313,740 B1 * | 11/2001 | Goetz | B60R 25/33 | |
| | | | 340/426.23 | |
| 6,411,217 B1 * | 6/2002 | Gabbard | B60R 25/102 | |
| | | | 340/5.1 | |
| 6,411,887 B1 * | 6/2002 | Martens | G08G 1/017 | |
| | | | 180/167 | |
| 6,470,260 B2 * | 10/2002 | Martens | G08G 1/017 | |
| | | | 180/167 | |
| 6,504,472 B2 * | 1/2003 | Machala | B60R 25/04 | |
| | | | 116/33 | |
| 6,505,101 B1 * | 1/2003 | Brill | B60R 25/042 | |
| | | | 340/425.5 | |
| 6,650,283 B2 * | 11/2003 | Brydges | G01S 5/0027 | |
| | | | 340/426.19 | |
| 6,950,013 B2 * | 9/2005 | Scaman | B60R 11/04 | |
| | | | 340/436 | |
| 7,015,792 B2 * | 3/2006 | Lessard | B60R 25/04 | |
| | | | 340/426.11 | |
| 7,091,821 B2 * | 8/2006 | Lessard | B60R 25/04 | |
| | | | 340/426.11 | |
| 7,154,384 B2 * | 12/2006 | Nitou | B60R 25/305 | |
| | | | 340/426.16 | |
| 7,573,373 B2 * | 8/2009 | Nguyen | B60R 25/042 | |
| | | | 307/10.1 | |
| 7,760,076 B2 * | 7/2010 | Boggess | B60R 25/043 | |
| | | | 340/426.11 | |
| 7,990,265 B2 * | 8/2011 | Fischbach | F41G 5/14 | |
| | | | 340/539.13 | |
| 8,004,410 B2 * | 8/2011 | Martinez de Velasco Cortina | | |
| | | | G06K 19/07758 | |
| | | | 340/572.4 | |
| 8,239,076 B2 * | 8/2012 | McGarry | G08G 1/096741 | |
| | | | 701/2 | |
| 8,387,735 B2 * | 3/2013 | Elson | B60L 3/04 | |
| | | | 180/167 | |
| 8,436,730 B2 * | 5/2013 | Fischbach | F41G 5/14 | |
| | | | 340/539.13 | |
| 8,761,821 B2 * | 6/2014 | Tibbitts | H04W 48/04 | |
| | | | 455/517 | |
| 9,008,906 B2 * | 4/2015 | Ricci | G06F 17/00 | |
| | | | 701/36 | |
| 9,079,555 B2 * | 7/2015 | Kaufman | B60R 25/045 | |
| 9,088,572 B2 * | 7/2015 | Ricci | H04L 63/10 | |
| 9,561,778 B2 * | 2/2017 | Atoche | G08G 1/096716 | |
| 9,776,632 B2 * | 10/2017 | Bowers | B60W 30/08 | |
| 9,821,767 B2 * | 11/2017 | Nixon | G07C 9/29 | |
| 9,914,432 B2 * | 3/2018 | Ramos Piedrahita | B60R 25/04 | |
| 10,020,995 B2 * | 7/2018 | Ricci | G06F 3/04883 | |
| 10,042,359 B1 * | 8/2018 | Konrardy | G05D 1/0255 | |
| 10,155,498 B2 * | 12/2018 | Howroyd | B60R 25/042 | |
| 2005/0243171 A1 | 11/2005 | Ross, Sr. | G08B 13/19645 | |
| | | | 348/148 | |
| 2012/0166021 A1 * | 6/2012 | Sawyer | F41H 13/0025 | |
| | | | 701/2 | |
| 2012/0306640 A1 * | 12/2012 | Al-Harbi | G08G 1/042 | |
| | | | 340/539.11 | |
| 2013/0203400 A1 * | 8/2013 | Ricci | G06F 11/2025 | |
| | | | 455/418 | |
| 2013/0219039 A1 * | 8/2013 | Ricci | H04B 1/3822 | |
| | | | 709/223 | |
| 2014/0143839 A1 * | 5/2014 | Ricci | G06F 21/602 | |
| | | | 726/4 | |
| 2014/0374182 A1 * | 12/2014 | Williams | G07C 5/008 | |
| | | | 180/167 | |
| 2018/0072263 A1 * | 3/2018 | Green | B60R 21/0136 | |
| 2018/0291575 A1 * | 10/2018 | Roe, Jr. | B60W 10/06 | |
| 2019/0149322 A1 * | 5/2019 | Bar-Nahum | H04L 9/0872 | |
| | | | 380/278 | |

* cited by examiner

COMMAND MODULE & MOBILE UNIT
RF FRONT END BLOCK DIAGRAM 110313

METHOD AND APPARATUS FOR DISABLING A VEHICLE

CROSS-REFERENCE TO RELATED APPLICATIONS

Provisional Application No. 62/076,184 filed Nov. 6, 2014

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates generally to a method and apparatus for disabling a vehicle and, in particular, to a method and apparatus for police to disable a vehicle involved in a police chase.

2. Description of Related Art

There have been many attempts to prevent an unauthorized person from starting a motor vehicle. There have also been various tracking devices to try to locate a stolen vehicle. The present invention allows a police car to stop a motor vehicle, especially if the motor vehicle is involved in a police chase.

BRIEF SUMMARY OF THE INVENTION

Installing a vehicle disable black box in an owner's automobile, will allow a police vehicle to disable the automobile in the event it is stolen and involved in a high speed chase.

A police transceiver, about the size of a cell phone, is plugged into a laptop computer, located inside a police vehicle. The police transceiver will attach to the windshield of the police vehicle. A vehicle disable software program, installed in the police computer, will give the police officer access to the description of nearby automobiles which are equipped with a Vehicle disable black box. Via the software program, the police officer will view a number of automobiles on the computer screen. Using several key features in the software i.e. make, model, license plate, etc., the police officer will determine which automobile is the correct one to disable, and broadcast wirelessly a signal targeting only the desired vehicle. This "disable" signal will be received by the targeted vehicle disable black box, and shut off power to the fuel line of the automobile.

The vehicle disable black box will be installed in place of the fuel pump fuse, located in the automobile. When triggered by a wireless RF transmission from the police transceiver, the vehicle disable black box will transmit a responding RF signal containing a description of the automobile, i.e. make, model, color, license plate number, etc.

The police transceiver is plugged into the police computer through a USB port. Via the vehicle disable software program, when prompted by the police officer, will transmit a specific RF signal, activating all "Stop the Chase Black Boxes" in the vicinity. This action will cause the "Stop the Chase Black Boxes" to transmit data to the police transceiver. The police transceiver will send data to the computer displaying a given number of automobiles equipped with the vehicle disable black box. The vehicle disable software program will display various tools assisting in correctly identifying the automobile to be disabled. Some of these tools may include: display the vehicle that is closest at the top of the screen, identifying the vehicle that has been involved in the chase the longest, and the data being transmitter by the "Black Boxes"; make, model, and license plate of the vehicle.

The complete Stop Chase System consists of at least 2 base stations called Command Module, CM, and numerous unique ID mobile units known as Mobile Unit, MU. The RF gain block, in both CM and MU are identical but are programmed to operate differently. The RF output of both modules is connected to a proprietary 0 dBi gain internal PCB ¼ wave antenna.

The CM derives its DC power from the USB port on the PC inside law enforcement vehicle, LEV. The CM may be placed at the center of the windshield approximately 3 inch above the base of dashboard using double sided tape. This effectively maximized the antenna radiation pattern gain in the direction looking outward the front of the LEV. Future model may allow external antenna on the top of the vehicle for improve sensitivity but at the expense of cost. Once the CM is connected to the PC, it will automatically activate the dialog menu to allow law enforcement to scan for armed vehicles in the local area about ¼ mile radius. If the armed vehicle is too far from the CM, the signal strength will be weaker. This information is displayed in the dialog menu. The CM software will also allow various methodology of sorting using simple 1 button control.

The MU is programmed with vehicle identification number, VIN and license plate. There are plans to add other information in the future. The VIN is coded with make, model and color. All this will be displayed on the CM software once intercepted. The MU derived its power from non-switch 12V inside the fuse compartment in the vehicle. The MU is armed once the ignition key is activated. It does not draw any power when the vehicle is power down. There are 3 wires on the MU, namely, un-switched 12V (UNSW12V), switched 12V (SW12V) and chassis ground. The UNSW12V and SW12V can be connected to either the fuel pump or ignition coil fuse holder in the fuse compartment by removing its fuse. This fuse is then inserted on the MU fuse holder. The chassis ground is connected to any body metal as ground return. There is reverse voltage protection circuit to prevent accidental connection. The MOSFET switch used in the MU is automotive grade capable of switching load in excess of 20 A, far beyond the normal 4 to 5 A requirement for fuel pump or ignition coil. The MU can be covertly place anywhere in the vehicle except in the engine compartment or area with high temperature. In most cases, the MU will fit in the fuse compartment. To the unknown vehicle operator, the vehicle will function normally even though it is armed. The CM will communicate with MU via RF link. Upon decision to stop the vehicle, the CM will send a command to MU to activate the MOSFET switch thus cutting power to fuel pump or ignition coil. This effectively disables the vehicle safely and effortlessly. Once the MOSFET is activated, it will need to be reset by the CM.

There is a method to bypass the MU if desired. The vehicle owner may remove wire hardness on the MU, the fuse on the MU, and reinsert the fuse back to the fuse holder in the fuse compartment.

These and other objects, advantages and features of this invention will be apparent from the following description taken with reference to the accompanying drawing, wherein is shown a preferred embodiment of the invention.

BRIEF DESCRIPTION OF THE SEVERAL VIEWS OF THE DRAWING

Figures 2, 3:
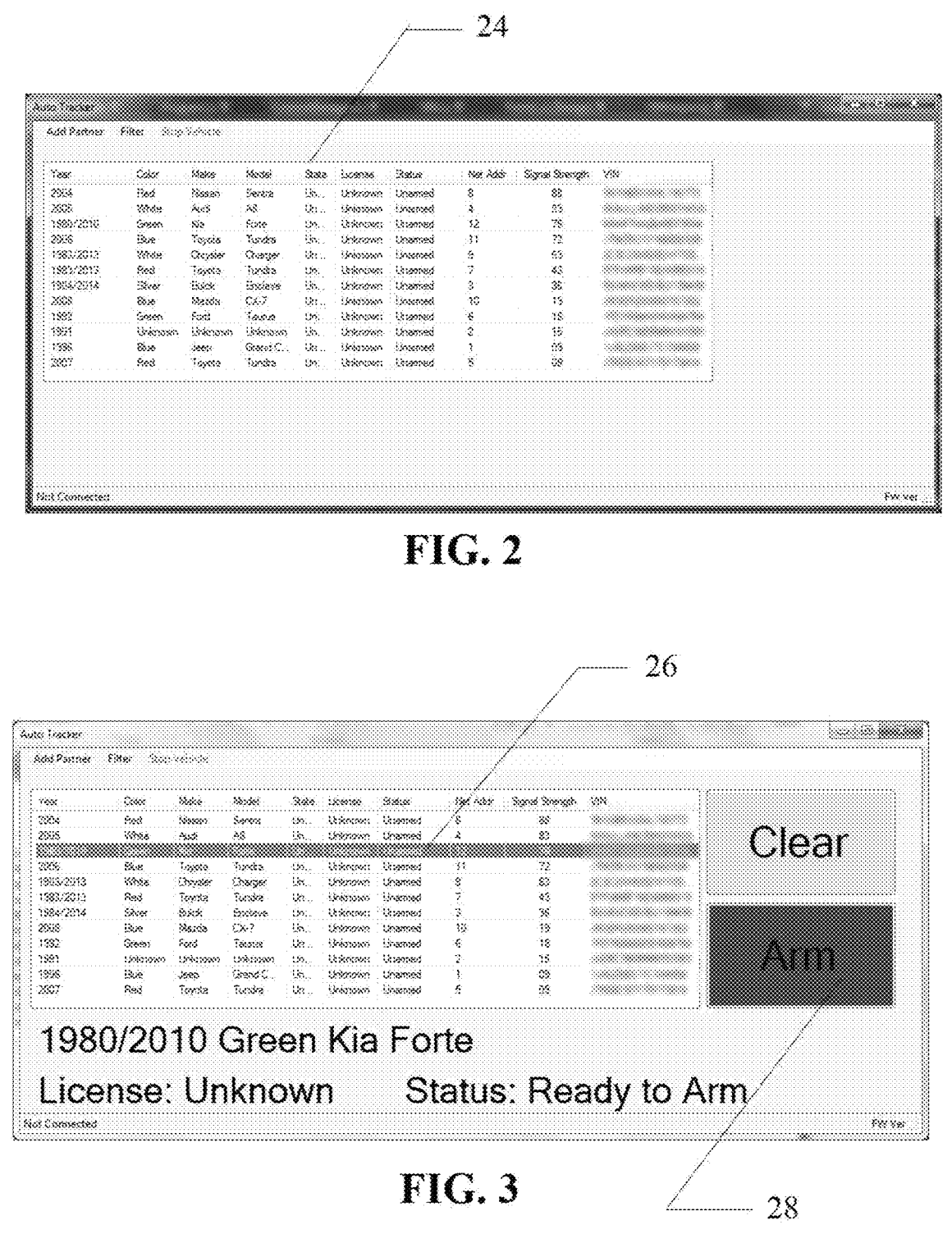

FIG. 2 is a view of the computer screen of FIG. 1, showing a screen with a number of vehicles appearing in the vicinity of the police car;

FIG. 3 is a view of a computer screen similar to the view of FIG. 2, but where a suspicious vehicle has been spotted and the status is changed to "Ready to Arm" for the suspicious vehicle;

DETAILED DESCRIPTION OF THE INVENTION

Figure 1:
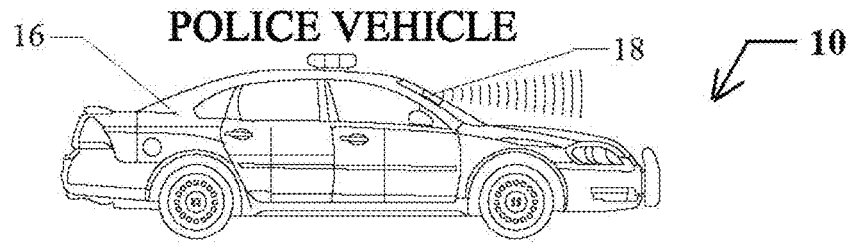
FIG. 1 is a pictorial representation of a police car chasing a stolen vehicle, showing a computer and transceiver in the police car and a replacement for the vacuum fuel pump fuse in the stolen vehicle, all according to the present invention.
Figure 1:
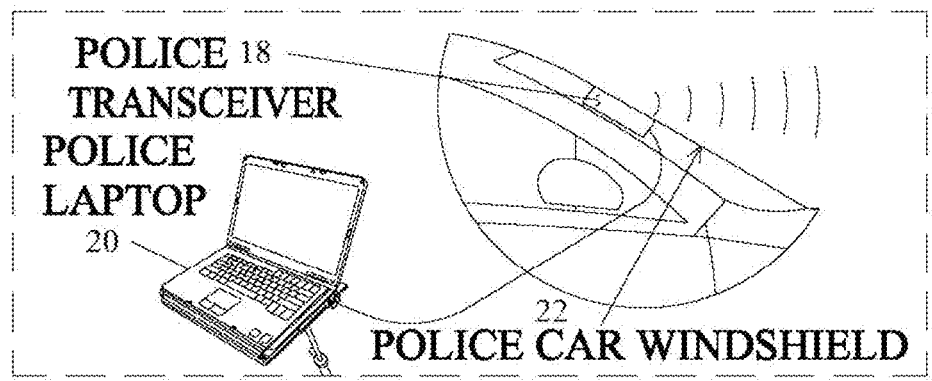
Figure 1:
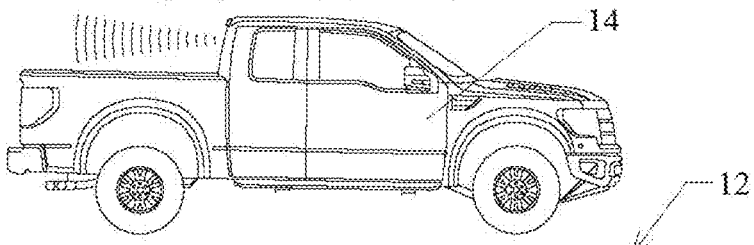
Figure 4:
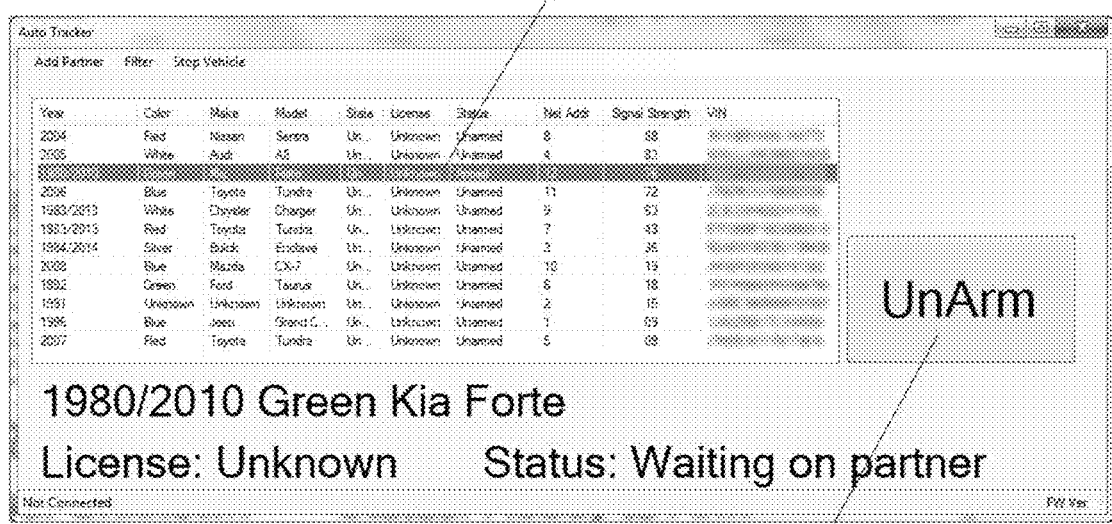
FIG. 4 is a view of a computer screen similar to the view of FIG. 3, but where the status has been changed to "Armed" for the suspicious vehicle.
Figure 5:
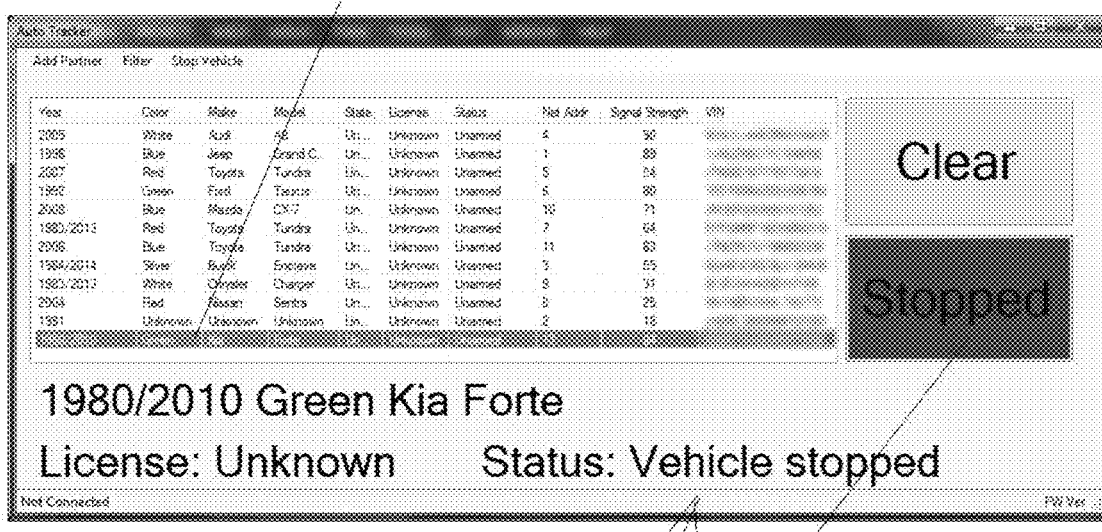
FIG. 5 is a view of a computer screen similar to the view of FIG. 4, but in which the suspicious vehicle has been stopped in and the status has been changed to "Stopped" for the suspicious vehicle.

Referring now to the drawing and in particular to FIG. 1, a system according to the present invention is referred to generally by reference number 10. System 10 includes a installing a black box 12 in an owner's automobile or other vehicle 14 such as a pick-up truck or a sports utility vehicle for disabling the vehicle. Black box 12 will allow a police vehicle 16 to disable the automobile or other vehicle 14 in the event it is stolen and involved in a high speed chase.

A police transceiver 18, about the size of a cell phone, is plugged into a laptop computer 20, located inside a police vehicle 16. The police transceiver will attach to the windshield 22 of the police vehicle. A vehicle disable software program, installed in the police computer, will give the police officer access to the description of nearby automobiles which are equipped with a vehicle disable black box. Referring also to FIGS. 2, 3, 4 and 5, via the software program, a police officer will view a number of vehicles 24 on the computer screen. Using several key features in the software i.e. make, model, license plate, etc., the police officer will determine which automobile or other vehicle 26 is the correct one to disable and will highlight vehicle 26 and click "Arm" 28. The computer screen now shows the highlighted vehicle and the notation "Status: Waiting on partner" 30 so that two police officers must agree that they are stopping the correct vehicle. During this time, the computer screen gives the first police officer the chance to click "UnArm" 32 to abort the process for vehicle 26. If the partner also clicks "Arm" then police transceiver 18 broadcasts wirelessly a signal targeting only the desired vehicle. This "disable" signal will be received by the targeted vehicle disable black box, and shut off power to the fuel line of the automobile, displaying "Stopped" 34 in addition to the message "Status: Vehicle stopped" 36.

The vehicle disable black box 12 will be installed in place of the fuel pump fuse, located in the automobile or other vehicle. When triggered by a wireless RF transmission from the police transceiver, the vehicle disable black box will transmit a responding RF signal containing a description of the automobile, i.e. make, model, color, license plate number, etc.

Police transceiver 18 is plugged into the police computer 20 through a USB port. Via the vehicle disable software program, when prompted by the police officer, will transmit a specific RF signal, activating all "Stop the Chase Black Boxes" in the vicinity, displaying number of vehicles 24. This action will cause the "Stop the Chase Black Boxes" to transmit data to the police transceiver. The police transceiver will send data to the computer displaying a given number of automobiles 24 equipped with the vehicle disable black box. The vehicle disable software program will display various tools assisting in correctly identifying the automobile to be disabled. Some of these tools may include: display the vehicle that is closest at the top of the screen, identifying the vehicle that has been involved in the chase the longest, and the data being transmitter by the "Black Boxes"; make, model, and license plate of the vehicle.

Figure 6:
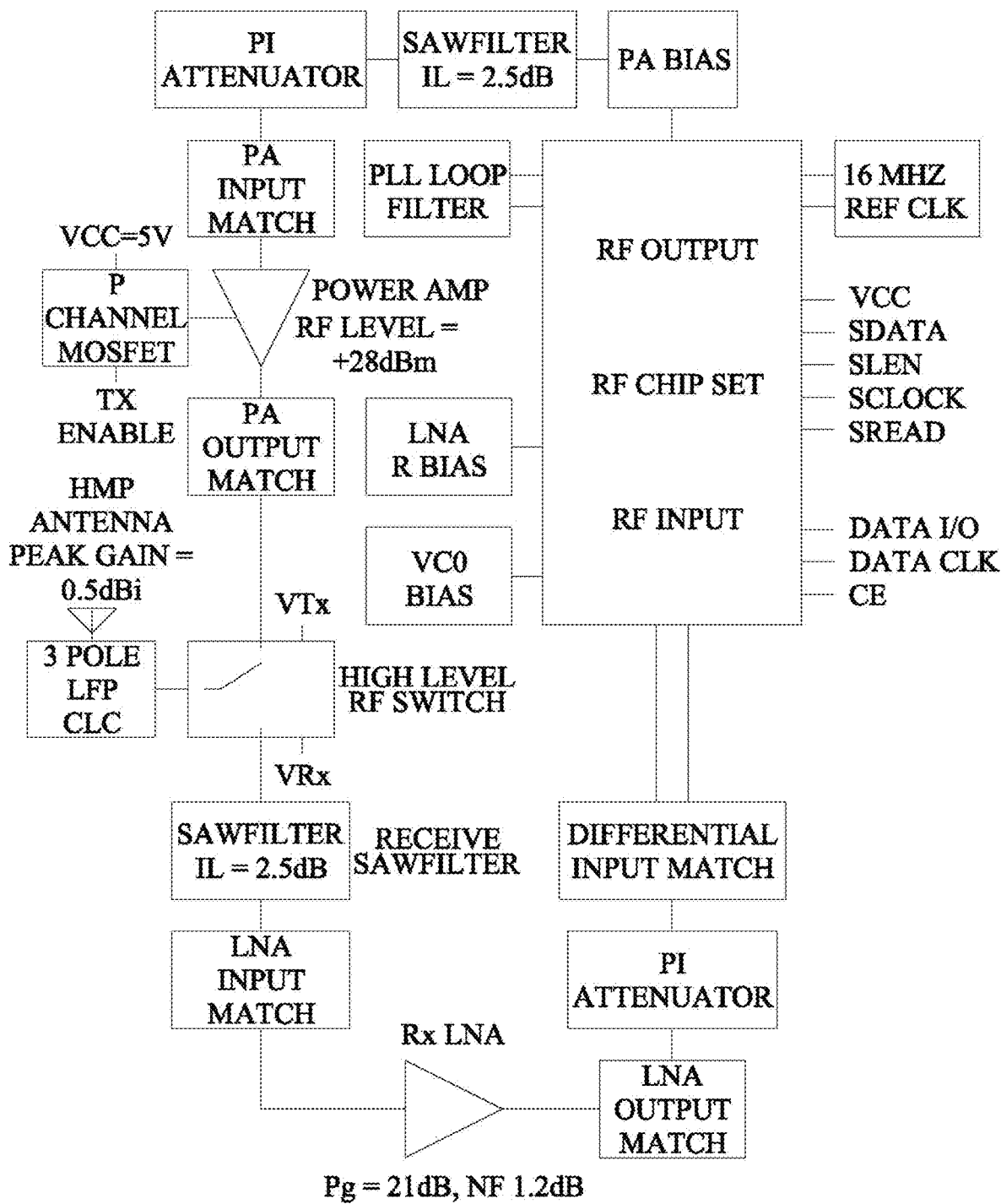
FIG. 6 is a block diagram view of a CM and MU RF Front End according to the present invention.
Figure 7:
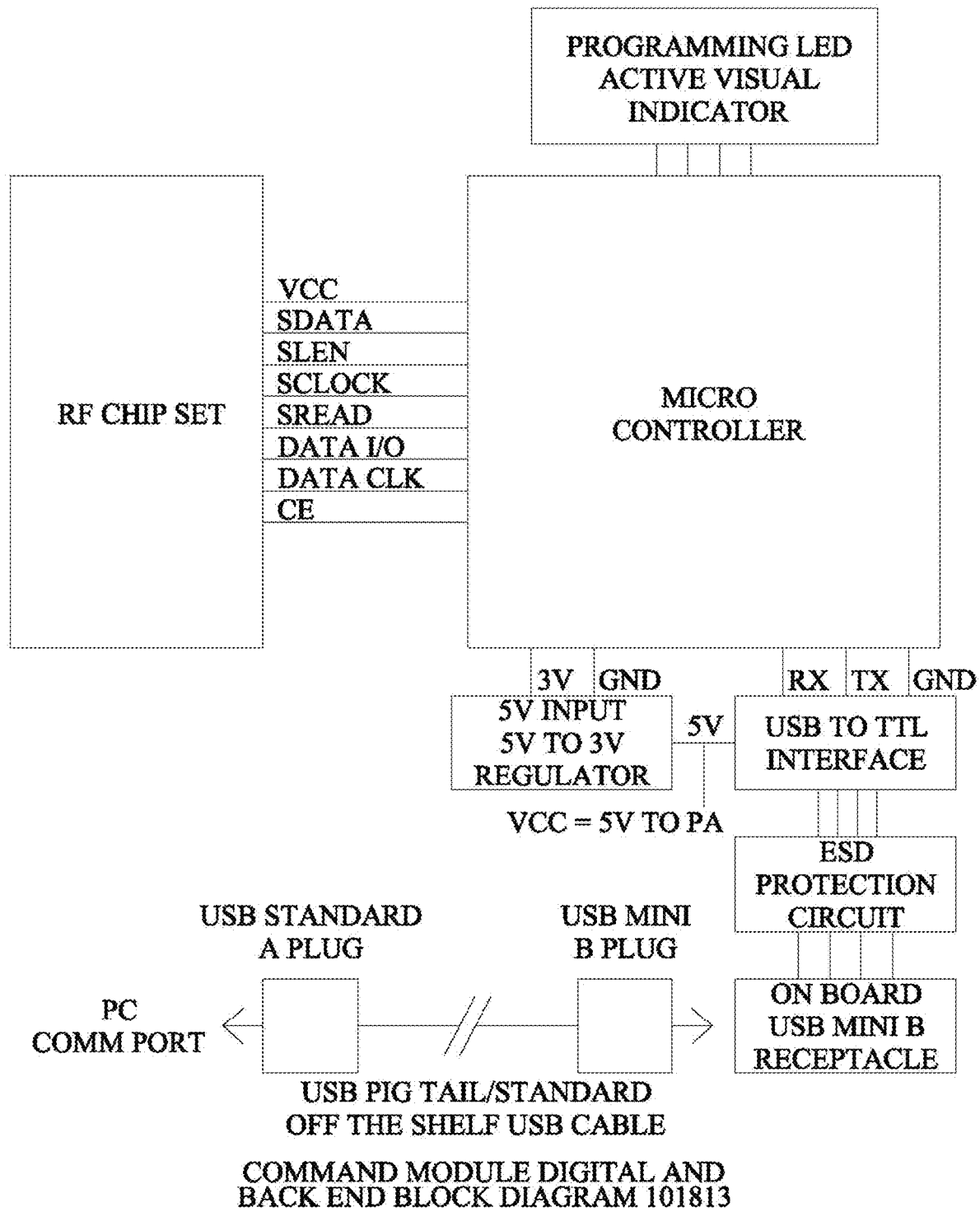
FIG. 7 is a block diagram view of a CM and Back End according to the present invention.
Figure 8:
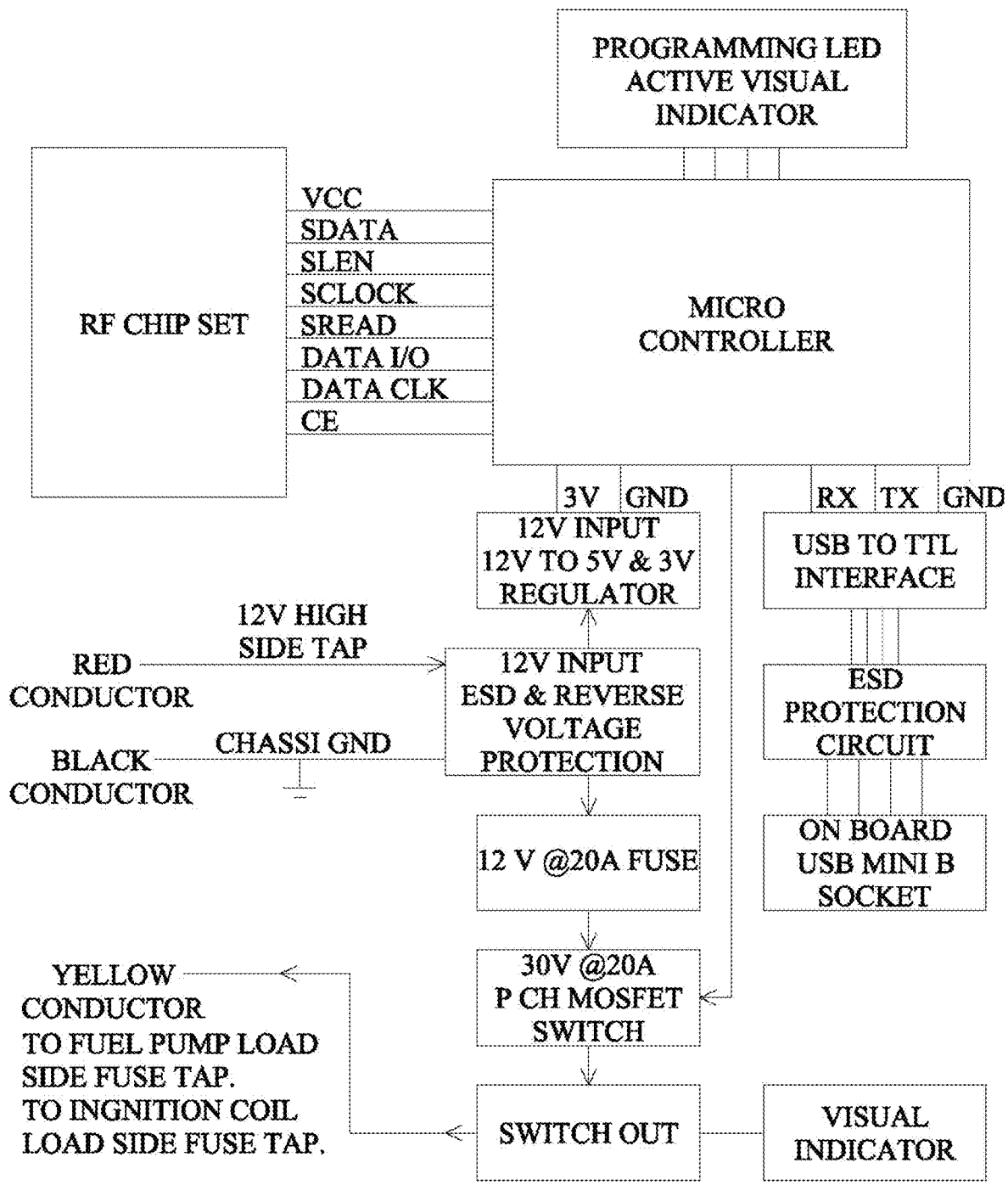
FIG. 8 is a block diagram view of a MU Digital and Back End according to the present invention.

Referring now to FIGS. 6, 7 and 8, a complete Stop Chase System according to the present invention, consists of at least 2 base stations called Command Module, CM, and numerous unique ID mobile units known as Mobile Unit, MU. The RF gain block, in both CM and MU are identical but are programmed to operate differently. The RF output of both modules is connected to a proprietary 0 dBi gain internal PCB ¼ wave antenna.

The CM derives its DC power from the USB port on the PC inside law enforcement vehicle, LEV. The CM may be placed at the center of the windshield approximately 3 inch above the base of dashboard using double sided tape. This effectively maximized the antenna radiation pattern gain in the direction looking outward the front of the LEV. Future model may allow external antenna on the top of the vehicle for improve sensitivity but at the expense of cost. Once the CM is connected to the PC, it will automatically activate the dialog menu to allow law enforcement to scan for armed vehicles in the local area about ¼ mile radius. If the armed vehicle is too far from the CM, the signal strength will be weaker. This information is displayed in the dialog menu. The CM software will also allow various methodology of sorting using simple 1 button control.

The MU is programmed with vehicle identification number, VIN and license plate. There are plans to add other information in the future. The VIN is coded with make, model and color. All this will be displayed on the CM software once intercepted. The MU derived its power from non-switch 12V inside the fuse compartment in the vehicle. The MU is armed once the ignition key is activated. It does not draw any power when the vehicle is power down. There are 3 wires on the MU, namely, un-switched 12V (UNSW12V), switched 12V (SW12V) and chassis ground. The UNSW12V and SW12V can be connected to either the fuel pump or ignition coil fuse holder in the fuse compartment by removing its fuse. This fuse is then inserted on the MU fuse holder. The chassis ground is connected to any body metal as ground return. There is reverse voltage protection circuit to prevent accidental connection. The MOSFET switch used in the MU is automotive grade capable of switching load in excess of 20 A, far beyond the normal 4 to 5 A requirement for fuel pump or ignition coil. The MU can be covertly place anywhere in the vehicle except in the engine compartment or area with high temperature. In most cases, the MU will fit in the fuse compartment. To the unknown vehicle operator, the vehicle will function normally even though it is armed. The CM will communicate with MU via RF link. Upon decision to stop the vehicle, the CM will send a command to MU to activate the MOSFET switch thus cutting power to fuel pump or ignition coil. This effectively disables the vehicle safely and effortlessly. Once the MOSFET is activated, it will need to be reset by the CM.

There is a method to bypass the MU if desired. The vehicle owner may remove wire hardness on the MU, the fuse on the MU, and reinsert the fuse back to the fuse holder in the fuse compartment.

RF Transmit Path

The FSK modulated output signal from ADF7020 is coupled into a bias network to provide the DC power to driver circuit internal the RF chip set. To maintain spectral purity outside the 902 to 928 MHz band, a high attenuation saw filter is used. The output of the saw filter is connected to a RF power amplifier. The power amplifier is capable of providing +28 dBm with input and output matching optimized. The RF switch following the PA is controlled by Tx mode command signal from microcontroller. The Tx level can be adjusted via software control to allow higher level transmit level. It may be lowered to reduce thermal dissipation. The RF level can vary from 0 dBm to +28 dBm with ADF7020 setting. The output of the power amplifier is impedance matching for optimum efficiency and to lower harmonic content. The output is couple into a low loss 2 way RF switch. The output of this RF switch is connected to a 3 pole low pass filter for harmonic suppression and impedance matching for the antenna. This system is considered a half-duplex because, it does not receive any signal while it is actively transmitting.

RF Receive Path

The receive signal is coupled into the antenna impedance matching network before going into the 2 way RF switch. The RF loss is kept minimum between the RF switch output and the receive saw filter. The receive saw filter is critical in preventing jamming due to high level RF signal from cell phone in proximity. The output of saw filter is connected to an impedance matching network for the input of LNA. The LNA is necessary for improved RF sensitivity. Its noise figure is 1.2 dB with 18 dB of RF gain. The impedance matching is to ensure low noise figure for the receive path. The output of the LNA is connected to yet another impedance matching network for optimum gain in the 902 to 928 MHz band. A PI attenuator is connected to the output of LNA to ensure intermod byproduct is kept minimum. This conditioned receive is differentially couple into the ADF7020 RF chip set whereby the FSK signal is demodulated and data is extracted.

RF Chip Set

The ADF7020 is the main interface between the digital data and the RF signal. It converts the receive signal into receive data and converts the transmit data into transmit signal. It has an internal phase lock loop which locks to the 16 MHz reference clock. The local oscillator is generated used 1 single external inductor. This direct down conversion chip set utilize minimum supporting components to accomplish FSK modulation and demodulation The channel frequencies are assigned as follows with 51 channel possible with 500 kHz BW. This list below is recommended and may vary in actual implementation.

| Channel Number | Frequency (MHz) |
| --- | --- |
| 101 | 902.25 |
| 102 | 902.75 |
| 103 | 903.25 |
| 104 | 903.75 |
| 105 | 904.25 |
| 106 | 904.75 |
| 107 | 905.25 |
| 108 | 905.75 |
| 109 | 906.25 |
| 110 | 906.75 |
| 111 | 907.25 |
| 112 | 907.75 |
| 113 | 908.25 |
| 114 | 908.75 |
| 115 | 909.25 |
| 116 | 909.75 |
| 117 | 910.25 |
| 118 | 910.75 |
| 119 | 911.25 |
| 120 | 911.75 |
| 121 | 912.25 |
| 122 | 912.75 |
| 123 | 913.25 |
| 124 | 913.75 |
| 125 | 914.25 |
| 126 | 914.75 |
| 127 | 915.25 |
| 128 | 915.75 |
| 129 | 916.25 |
| 130 | 916.75 |
| 131 | 917.25 |
| 132 | 917.75 |
| 133 | 918.25 |
| 134 | 918.75 |
| 135 | 919.25 |
| 136 | 919.75 |
| 137 | 920.25 |
| 138 | 920.75 |
| 139 | 921.25 |
| 140 | 921.75 |
| 141 | 922.25 |
| 142 | 922.75 |
| 143 | 923.25 |
| 144 | 923.75 |
| 145 | 924.25 |
| 146 | 924.75 |
| 147 | 925.25 |
| 148 | 925.75 |
| 149 | 926.25 |
| 150 | 926.75 |
| 151 | 927.25 |
| 152 | 927.75 |

Pulse width/duration control can be applied to the MOSFET switch is one way to slow the vehicle down. Instead of applying a control signal of either "on" or "off" which will kill the fuel pump, a high frequency pulse can be sent to the MOSFET switch. By varying the duty cycle of the pulse, the average voltage to the fuel pump can vary from a maximum of its battery voltage to something of 75%, 50% or even 25%. This drop is supply voltage to the fuel pump will not cause irreversible damage but will cause the fuel pump to reduce is ability to pump at maximum capacity. This ultimately results in choking part of the fuel to the engine, thus the car becomes sluggish and unable to accelerate on demand. This feature can be applied by one CM (1 law Enforcement vehicle) but to disable the vehicle would still require two law enforcement vehicles or two other locations.

From the foregoing it will be seen that this invention is well adapted to attain all of the ends and objectives hereinabove set forth, together with other advantages which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the figures of the accompanying drawings is to be interpreted as illustrative and not in a limiting sense.

The invention claimed is:

1. A system comprising in combination:
    a black box installed in each of various vehicles;
    a police vehicle;
    a computer located inside the police vehicle, wherein the computer includes a screen;
    a transceiver connected to the computer; the transceiver located inside the police vehicle;
    a vehicle disable software program, installed in the computer, wherein the software program will give access to the description of nearby vehicles which are each equipped with a vehicle black box by triggering an inquiry wireless transmission from the police transceiver, the black box for each nearby vehicle will transmit a memory in the a responding signal containing a description of the vehicle, including make, model, color, and license plate number;
    the computer program enables the transceiver to disable a target vehicle by transmitting two wireless transmissions directed to only the target vehicle; and
    wherein a first signal selects the target vehicle and a second signal arms the selection, the computer screen shows the highlighted vehicle and the notation "Status: Waiting on partner" after the first signal so that the first signal and the second signal must agree that they are stopping the correct vehicle.

2. The system according to claim 1 wherein when the first signal and the second signal agree on arming, a signal is sent from the computer through the transceiver to shut off power to the fuel line of the target vehicle, stopping the targeted vehicle.

3. The system according to claim 2 wherein when the target vehicle is triggered by a wireless transmission from the transceiver, the vehicle disable black box will transmit a responding signal containing the description of the vehicle.

4. The system according to claim 3 wherein when the black box of the target vehicle has been disabled, and the fuel line of the target vehicle has been stopped, the computer screen displays "Stopped" in addition to the message "Status: Vehicle stopped".

5. A system according to claim 1 one wherein the vehicle disable black box is installed in place of the fuel pump fuse, located in the target vehicle.

6. A system according to claim 5 wherein the black box memory for the target vehicle description, including make, model, color, year, and license plate number, which can be accessed by activating an inquiry through the transceiver thus identifying the original vehicle even if the original vehicle has been painted or it has different license plates.

7. A system according to claim 1 wherein the black box memory for the target vehicle description, including make, model, color, year, and license plate number, which can be accessed by activating an inquiry through the transceiver thus identifying the original vehicle even if the original vehicle has been painted or it has different license plates.

8. The system according to claim 1 wherein the display of vehicles on the computer screen displays the vehicle that is closest to the police vehicle at the top of the list.

9. The system according to claim 1 wherein the display of vehicles on the computer screen displays the vehicle that has been displayed the longest at the top of the list.

* * * * *